Patented Sept. 18, 1945

2,385,256

UNITED STATES PATENT OFFICE 2,385,256

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941,
Serial No. 403,011

2 Claims. (Cl. 260—42)

This invention relates to thermoplastic compositions comprising polymeric vinylidene chloride products modified with alkyd resins.

As herein used, the term "polymeric vinylidene chloride product" includes the polymer of vinylidene chloride alone and other products, whether polymers, copolymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

The alkyd resins which may be used in the present invention include all those complexes resulting primarily from the interaction of a polyhydric alcohol with a polybasic acid or its anhydride, such as for example, the product resulting from the reaction of glycerine and phthalic anhydride, with or without other reacting agents. They are grouped broadly into three types, namely, oxidizing, non-oxidizing and modified. They may be further classed as, (1) heat non-convertible, that is, they do not gel on heating, (2) heat convertible, that is, heat treatment converts them into infusible and insoluble products, (3) element convertible, that is, those derived from unsaturated acids or alcohols, the properties of which are irreversibly altered by oxidation of the unsaturated component by the elements. The alkyd resins may be modified by reaction with drying and non-drying oils and their acids, or with natural or other synthetic resins.

Examples of alkyd resins mentioned in the preceding paragraph are characterized by the following definitions from the trade catalogues of the various companies supplying such resins:

Esterol 830 (Paramet): Pure alkyd resin free of phenol; 50% solids, 50% toluol; sp. g., 0.994; air dry: set to touch 45'-60', tack free, 3-4 hrs.; bake 1½ hrs. at 190°-220° F.; immiscible with oils and short oil varnishes; 8.28 lbs. per gal. at 25° C.; acid value, 10-12; color (Hellige-Klett), 1L; viscosity (Gardner-Holdt), Q-R; solubility complete in all coal tar solvents and commonly used lacquer solvents.

Duraplex C-45 (Resinous Products): 58-62% solids; soluble in M. T.; sp. g., 0.95; lbs. per gal., 8.0; acid number, 100; resin 5-15; color—60% solids (Inst. P. & V. R.), 6-8; air dry 75-90 min.; bake 2-3 hrs. 180°-225° F.; viscosity C-F at 40% M. T.

Tolerance: M. T.—100%; Q body oxidizing—oil: resin—50-50; chlorinated rubber—100%; varnish/resin—20/80.

Rezyl 1103 (American Cyanamide): Liquid resin. Not supplied in solution. Lbs./gal. 9.0; refrac. index 20° C.—1.512; acid number—28-33; color (I. P. & V. R.)—1L-2L; bake 2-3 hrs. at 180°-220° F.; completely compatible with mineral spirits, NO₂-cellulose, Cl-rubber. 75% drying oils, 30% to ethyl cellulose.

Aroplaz 930 (S & W Corp.): Percent N. V.—100; viscosity—(G. H. V-W; viscosity (poises) 8.8-10.7; acid value 4-6; color (G. H.—1933)—810, color (Hellige)—3L-4; lbs./gal. 20° C. (plastic 8.57; solution 8.57); short, pure, non-oxidizing alkyd.

Amberlac D-96 (Resinous Products): Hard, slightly plastic. Initial softening point—76°-82° C.; color (Rosin scale)—approx. M.; acid number 30-50. Somewhat flexible.

Paranol LB-89 (modified maleic type resin) (Paramet): Acid number—12-14; M. P.—220°-230° F.; color (extra light)—WG; sp. g.—1.11; lbs./gal.—9.30. Solubility complete in mineral spirits, all coal tar solvents and commonly used lacquer solvents. Ins. in alcohol.

Lewisol 2L (Lewis): Color—N-WG; M. P.—130°-140° C.; acid value—6-12; lbs./gal.—9.5 modified maleic acid resin.

Lewisol 18 (Lewis): Color—N-WG; M. P. 115°-120° C.; acid value 12-18; lbs./gal., 9.4; relatively cheap resin. Compatible with Et cell. and chlorinated rubber. (Modified maleic.)

Rezyl 99-4 (American Cyanamide): Complex chemical combinations of phthalic, etc., acids, glycerine, etc., and modifying agents. This is 50% in toluol; sp. g.—solid resin—1.17; 50% soln. 1.01; lbs./gal. solid—9.8; stock solution—8.4; 50% solution; color (I. P. & V. R.)—1L; ASTM softening point—55-58° C.; acid number—4-8; average refractive index, 1.5265; 100% compatibility with NO₂-cellulose, 10% compatibility to ethyl cellulose.

According to the present invention alkyd resins are incorporated with a polymeric vinylidene chloride product to produce a mass which can be molded or extruded to form articles having a waxy "handle" and a high gloss. For example, an alkyd resin may be incorporated with a polymeric vinylidene chloride product to produce a mass that can be molded or extruded at lower temperatures and pressures than can the polymeric vinylidene chloride product alone, and articles prepared from such compositions retain a high tensile strength. In many instances addition of the alkyd resin has a plasticizing effect, particularly at elevated temperatures, and produces a mass that can easily be molded or extruded to form useful articles having a tough, durable, glossy finish and which retain a resistance to chemicals typical of polymeric vinylidene chloride products. Furthermore addition of an alkyd resin to a polymeric vinylidene chloride product produces a mass that can easily be extruded to form threads, bands, filaments, foils, and the like which are more flexible, have a waxy handle, a glossy finish, and which retain the high tensile strength shown by similar articles prepared from the polymeric vinylidene chloride product alone.

The addition of the alkyd resins to the polymeric vinylidene chloride product may be effected by any of several methods. For example, the polymeric vinylidene chloride product and the particular alkyd resin to be employed may be mixed or ground together in a ball mill or other suitable mixer commonly employed in the plastic art, or they may be added to the polymer on hot rolls in a method similar to compounding rubber compositions. Another satisfactory method of incorporating the alkyd resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting:

*Example 1*

A quantity containing 2.5 grams of Esterol 830, a solution of an oxidizing type of alkyd resin identified in "Chemical and Metallurgical Engineering," vol. 41 (1934) at page 591, as being a glycerol-phthalic anhydride resin, and 5.0 grams of 1,2-epoxy-3-(2-phenylphenoxy) propane, to serve as a heat stabilizer, were incorporated with 18 milliliters of acetone. To this solution was added 42.5 grams of a co-polymer consisting of 90 per cent vinylidene chloride and 10 per cent vinyl chloride. The mixture was ground until thoroughly blended, and then dried. The composition could easily be molded or extruded and filaments, having a diameter of 0.015 inch, prepared from this material were flexible, shiny threads and had a tensile strength above 43,000 pounds per square inch.

*Example 2*

A composition was prepared as in Example 1 but substituting Duraplex C-45, a solution of an oxidizing type of an oil-modified, thermosetting alkyd resin, for the Esterol 830. The composition could easily be molded or extruded and filaments, having a diameter of 0.014 inch, prepared from this material were translucent, flexible threads with a waxy handle and had a tensile strength above 38,000 pounds per square inch. The Duraplex resins are made by The Resinous Products and Chemical Company, whose "Synthetic Resins catalog, April, 1941, at page 18, defines Duraplex resins as "oil-modified alkyds derived from phthalic anhydride, glycerine, and oil fatty acids."

*Example 3*

A composition was prepared as in Example 1 but substituting Rezyl 1103, a liquid, oxidizing type of an unsaturated fatty acid-modified alkyd resin, for the Esterol 830. The composition could easily be molded or extruded and filaments, having a diameter of 0.015 inch, prepared from this material were tough, shiny, flexible threads and had a tensile strength above 42,000 pounds per square inch. Rezyl resins are listed as glycerol-phthalic anhydride resins in "Chemical and Metallurgical Engineering," vol. 41 (1934) at page 595.

*Example 4*

A composition was prepared as in Example 1 but substituting Aroplaz 930, a solution of a non-oxidizing type of a thermosetting, pure alkyl resin, for the Esterol 830. The composition could easily be molded or extruded and filaments, having a diameter of 0.014 inch, prepared from this material were flexible, shiny threads and had a tensile strength above 40,000 pounds per square inch.

*Example 5*

A composition was prepared as in Example 1 but substituting Rezyl 99-4, a solution of a non-oxidizing type of a fatty acid-modified alkyd resin, for the Esterol 830. The composition could easily be molded or extruded and filaments, having a diameter of 0.016 inch, prepared from this material were translucent, flexible threads, with a waxy handle and had a tensile strength above 43,000 pounds per square inch. Rezyl resins are listed as glycerol-phthalic anhydride resins in "Chemical and Metallurgical Enigneering," vol. 41 (1934) at page 595.

*Example 6*

2.5 grams of Teglac Z152, a natural resin-modified, alkyd resin having a melting point of 123°–130° C., and 5.0 grams of 1,2-epoxy-3-(2-phenylphenoxy) propane, to serve as a heat stabilizer, were incorporated with 20 milliliters of acetone. To this solution was added 42.5 grams of a co-polymer consisting of 90 per cent vinylidine chloride and 10 per cent vinyl chloride. The mixture was ground until thoroughly blended and then dried. The composition could easily be molded or extruded and filaments having a diameter of 0.015 inch, prepared from this material were tough, shiny, threads and had a tensile strength above 44,000 pounds per square inch.

*Example 7*

A composition was prepared as in Example 6 but substituting Amberlac D-96 an oil-modified thermosetting alkyd resin having a melting point of 104°–106° C., for the Teglac Z-152. The composition could easily be molded or extruded and filaments, having a diameter of 0.013 inch, prepared from this material were flexible, waxy, translucent threads and had a tensile strength above 52,000 pounds per square inch.

*Example 8*

A composition was prepared as in Example 6 but substituting Paranol LB-89, a maleic acid-modified alkyd resin having a melting point of 82°–89° C., for the Teplac Z-152. The composition could easily be molded or extruded and filaments, having a diameter of 0.015 inch, prepared from this material were shiny, flexible threads with a high gloss and had a tensile strength above 44,000 pounds per square inch.

*Example 9*

A composition was prepared as in Example 6 but substituting Paranol 1640, a phenol-formaldehyde resin-modified alkyd resin having a melting point of 116°–130° C., for the Teglac Z-152.

The composition could easily be molded or extruded and filaments having a diameter of 0.015 inch, prepared from this material were shiny, tough threads and had a tensile strength above 48,000 pounds per square inch.

Example 10

2.5 grams of Lewisol 2L, a maleic acid-modified alkyd resin having a melting point of 92°-102° C., and 5.0 grams of tributyl aconitate, to serve as a heat stabilizer, were incorporated with 18 milliliters of acetone. To this solution was added a co-polymer consisting of 90 per cent vinylidene chloride and 10 per cent vinyl chloride. The composition could easily be molded or extruded and filaments, having a diameter of 0.0115 inch, prepared from this material were flexible, tough threads with a waxy handle and had a tensile strength above 52,000 pounds per square inch.

Example 11

A quantity corresponding to 4.5 grams of solids of Aroplaz 930, a solution of a non-oxidizing type of a thermosetting, pure alkyd resin, and 0.5 gram of a co-polymer consisting of 90 per cent vinylidine chloride and 10 per cent vinyl chloride were placed in a test tube and heated at about 165° C., until the materials were fused. The product was a tan colored, homogeneous, greasy paste.

Example 12

A quantity, corresponding to 3.0 grams of solids of Esterol 630, a solution of a non-oxidizing type of a pure alkyd resin, and 2.0 grams of a co-polymer as in Example 9, were heated in a test tube at about 165° C., until the materials were fused. The product was a hard, brittle, homogeneous mass and had a brown color.

Example 13

3.0 grams of Lewisol 18, a maleic acid-modified type of an alkyd resin having a melting point of 95°-98° C., and 2.0 grams of a co-polymer as in Example 9 were heated to a fusion temperature. The product was a light amber colored, homogeneous, brittle mass.

The compositions which contain relatively low proportions of the alkyd resin have improved molding and extruding properties, while the compositions which contain relatively large proportions of the alkyd resins will, depending on the type of alkyd resin used range from soft pastes to hard brittle masses. The latter compositions may be advantageously used in preparing improved lacquers, varnishes or paints.

The proportion of alkyd resin to be employed in the new compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibility at all temperatures met with in service, and be sufficiently hard and tough enough to withstand abrasion. Similarly, lacquer coatings must be hard, tough and possess good adherence and flexibility. The exact proportion of modifying agent to be employed in preparing the new compositions will depend on the use requirements. In general from about 0.5 to about 90 per cent of the alkyd resin may be employed, based on the weight of the polymeric vinylidene chloride product with which they are incorporated. When it is desired simply to produce a product having improved molding and extruding properties and which can be worked to form useful articles, threads, bands, filaments, foils and the like which retain the high tensile strength shown by the parent polymeric vinylidene chloride product the amount of alkyd resin will ordinarily vary from about 0.5 to about 40 per cent and more specifically from about 2 to about 7.5 per cent. When, however, it is desired to produce a polymeric vinylidene chloride product which is substantially more compatible with many of the commonly used lacquer solvents the amount of alkyd resin employed may vary from about 10 to about 90 per cent.

While the above examples show the preparation of compositions from a polymeric vinylidene chloride product consisting of a co-polymer of 90 per cent vinylidene chloride and 10 per cent vinyl chloride, incorporated with alkyd resins, other polymeric vinylidene chloride products which have wide commercial value and which may be advantageously used in preparing the new compositions, include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenylphenoxy) propane, allyl-disulfide, 2-chloroallyl-disulfide, 2,2'-dihydroxy-benzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful and desirable when used in such amounts that the desirable mechanical properties of the product are not affected.

Other modes of applying the principle of our invention may be employed instead of those explained, change being made as regards the materials employed, provided the product recited in the following claims be obtained.

We therefore point out and distinctly claim as our invention.

1. A thermoplastic molding and extrusion composition, the essential ingredients of which are a vinylene chloride polymer in which vinylidene chloride constitutes at least 70 per cent of the polymer, and from about 2 to about 7.5 per cent of an alkyd resin based on the weight of the polymer.

2. A thermoplastic molding and extrusion composition, the essential ingredients of which are a copolymer of from about 5 to about 30 per cent of vinyl chloride and correspondingly from about 95 to about 70 per cent of vinylidene chloride, and from about 2 to about 7.5 per cent of an alkyd resin based on the weight of the copolymer.

EDGAR C. BRITTON.
HAROLD W. MOLL.